Sept. 6, 1932.                B. ZETTERGREN                1,875,794
MACHINE FOR KNEADING, CRUSHING, AND SIMILAR OPERATIONS
Filed Feb. 8, 1928          4 Sheets-Sheet 1
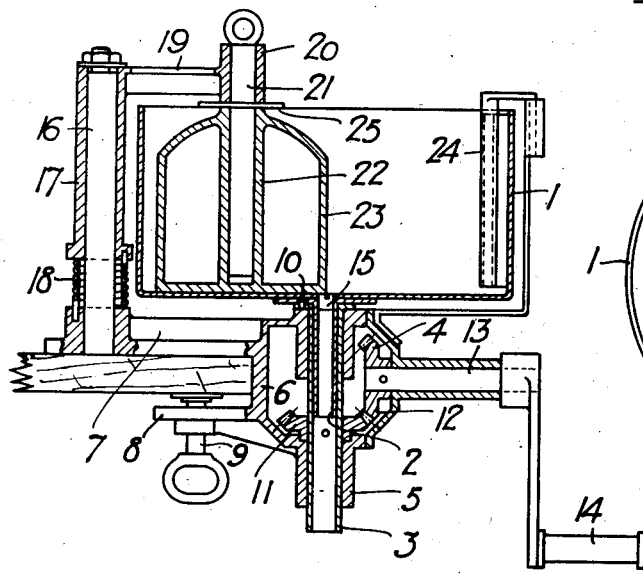
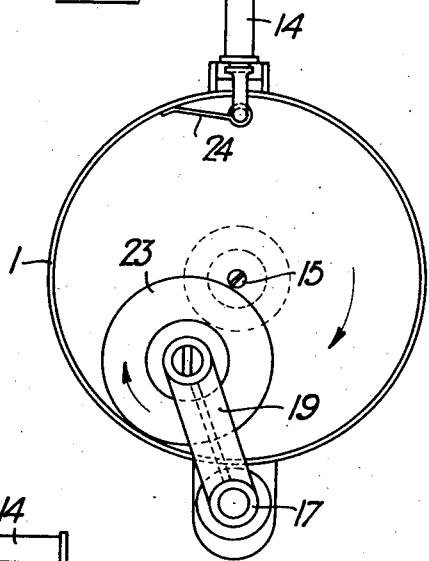
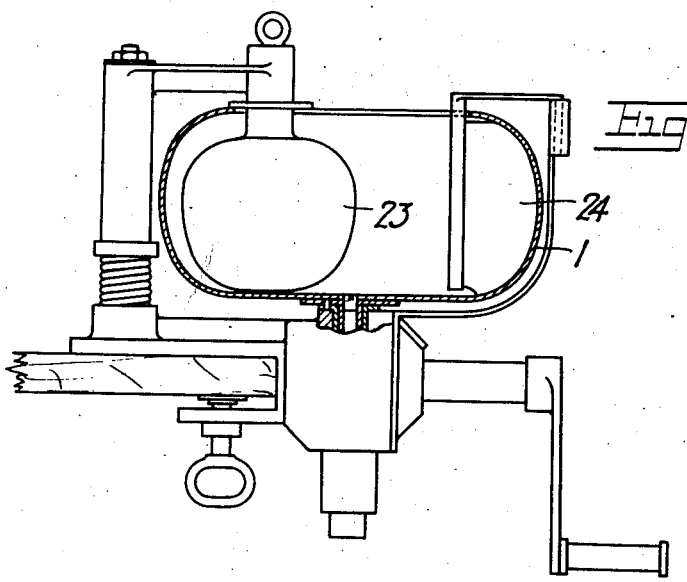
Inventor,
Birger Zettergren,

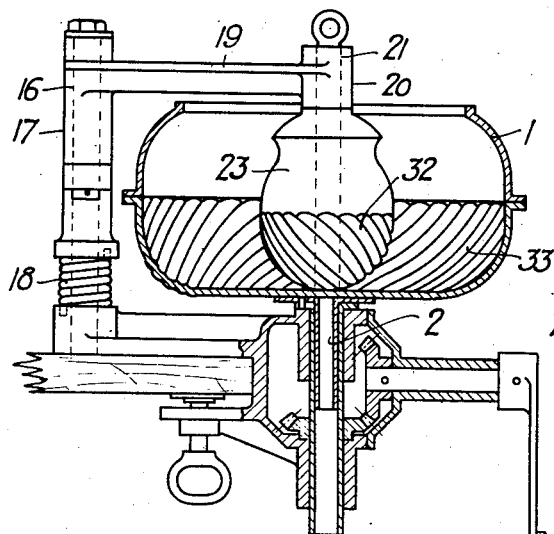
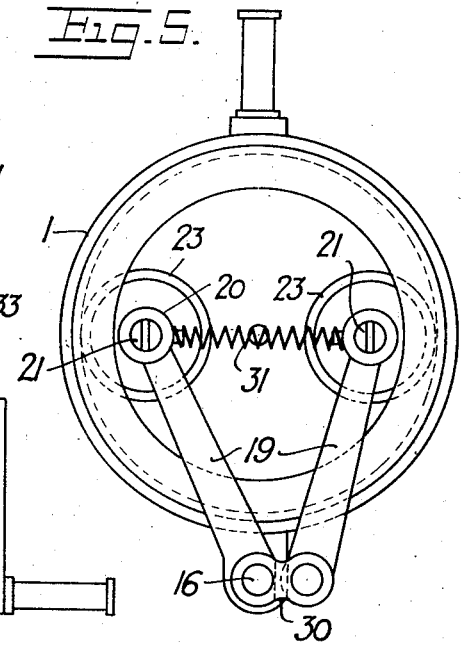
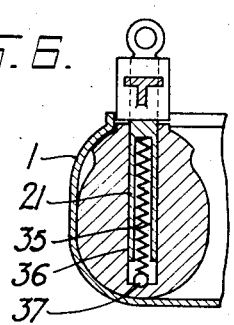
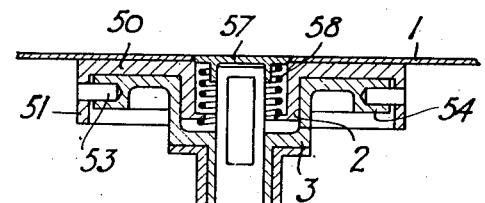
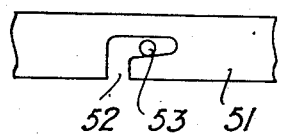

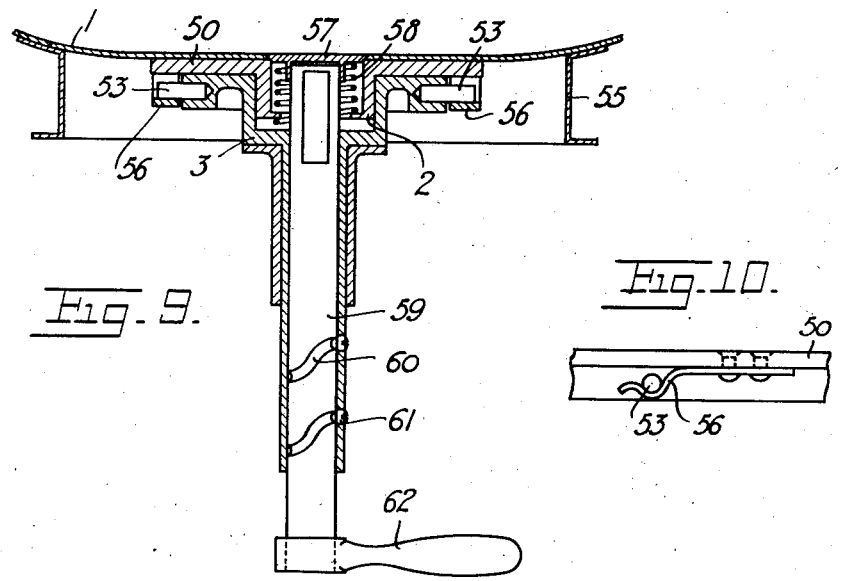

Sept. 6, 1932.  B. ZETTERGREN  1,875,794
MACHINE FOR KNEADING, CRUSHING, AND SIMILAR OPERATIONS
Filed Feb. 8, 1928  4 Sheets-Sheet 4
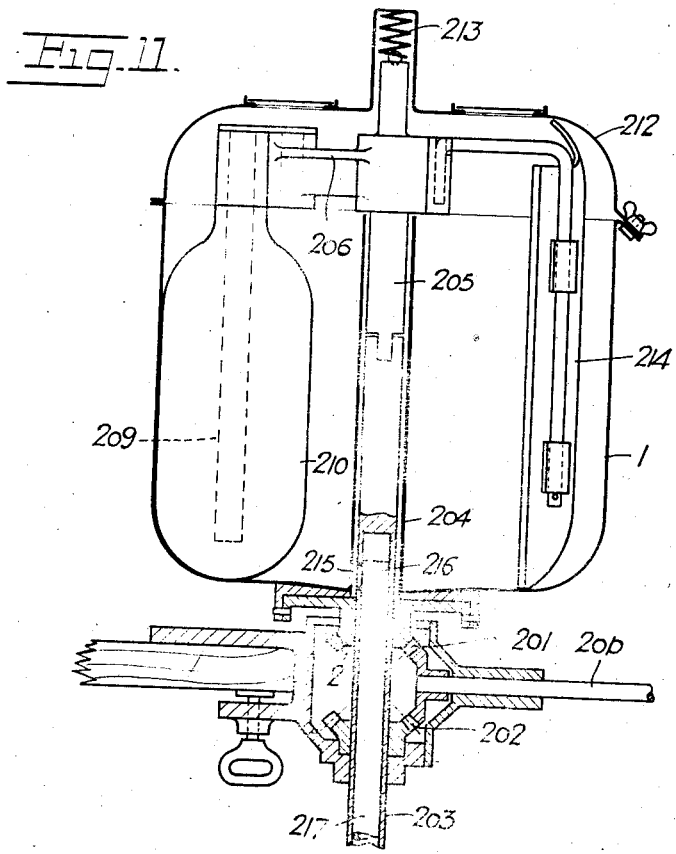
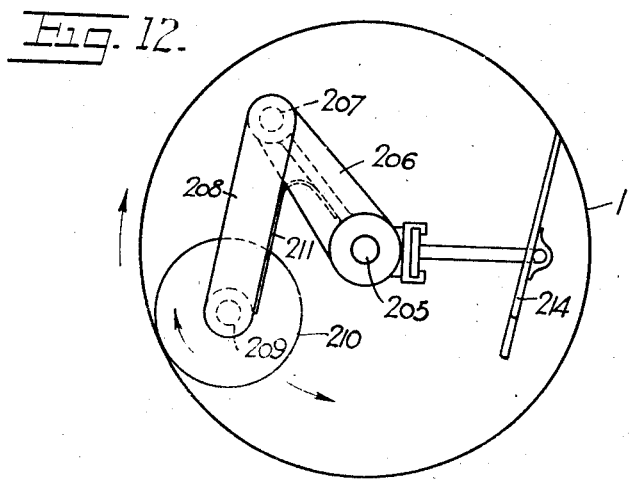

Patented Sept. 6, 1932

1,875,794

UNITED STATES PATENT OFFICE

BIRGER ZETTERGREN, OF STOCKHOLM, SWEDEN, ASSIGNOR TO HELGE GUSTAF TORULF, OF STOCKHOLM, SWEDEN

MACHINE FOR KNEADING, CRUSHING, AND SIMILAR OPERATIONS

Application filed February 8, 1928, Serial No. 252,857, and in Sweden October 15, 1927.

This invention relates to a machine, by means of which kneading, crushing, mixing and similar operations may be performed in a simple and time saving way.

The machine according to this invention comprises, substantially, a rotary receptacle to receive the material to be treated, and one or more roller or rollers yieldingly pressed against the inside of said receptacle which are caused upon the rotation of the receptacle to rotate continuously about an axis or axes parallel or substantially parallel to the axis of rotation of said receptacle.

In the accompanying drawings various embodiments of the invention are illustrated. Fig. 1 is a vertical section of a machine according to one embodiment. Fig. 2 is a plan view of the same machine. Fig. 3 is a side elevation, partly in section, of a machine according to a second embodiment of the invention. Fig. 4 is a vertical section of a machine according to a third embodiment. Fig. 5 is a plan view of the same machine. Fig. 6 is a vertical section of a portion of a fourth embodiment. Fig. 7 is a vertical section of a modified mounting of the receptacle. Fig. 8 is a detail view. Figs. 9 and 10 are views, corresponding to Figs. 7 and 8, of a further modified mounting of the receptacle. Fig. 11 is a vertical section of a machine according to a sixth embodiment. Fig. 12 is a plan view thereof.

With reference to Figs. 1 and 2 the numeral 1 indicates an open topped receptacle, which is shown as of cylindrical shape but which may be of any other appropriate form. Said receptacle is provided with a central shaft 2, attached to the underside of the receptacle by means of a flange. Shaft 2 engages a vertical sleeve 3 mounted at 4 and 5 in a frame 6 adapted to be secured to the edge of a table or the like and to this end provided with an upper arm 7 to rest on the upper surface of the top of the table, and a lower arm 8 extending below the table top and held by means of a clamping screw 9. By means of a pin 10 depending from the flange of the shaft 2 which engages a hole formed in a flange at the upper edge of the sleeve 3, the shaft 2 is non-rotatably connected to sleeve 3, while still permitting the receptacle 1 to be freely lifted. The sleeve 3 thus forming the rotary shaft proper of the receptacle is connected by bevel gears 11, 12 to a horizontal driving shaft 13 which may be either driven manually by means of the crank 14, as shown in the drawings, or by means of a motor.

The shaft 2 is hollow and closed at its top by a removable plug 15.

The arm 7 supports an upright 16 upon which a sleeve 17 is rotatably mounted. Said sleeve 17 rests upon a spring 18 surrounding the upright 16 one end of which is secured to the arm 7, the other end of the spring being secured to the sleeve 17 so that the spring tends to rotate the sleeve in a determined direction. At its top the sleeve 17 is formed with a laterally projecting arm 19 forming at its outer end a sleeve 20 to carry a depending shaft 21 which also engages a sleeve upstanding centrally from the bottom of a roller 23 placed in the receptacle 1.

Said roller 23 bears with its plane bottom upon the likewise plane bottom of the receptacle 1 and is pressed by the action of the spring 18 against the inside wall of the receptacle as shown in Fig. 2.

Upon rotation of the receptacle 1 the roller 23 is caused to rotate due to the friction against the bottom and inside wall of the receptacle, the rotation of the roller taking place around the shaft of the roller, as represented by the shaft 21. The diameter of the roller 23 corresponds in the embodiment shown nearly to the radius of the receptacle 1 and, while the bottom of the receptacle near the periphery tends to rotate the roller in the direction of rotation of the receptacle and at the same circumferential speed as the latter, said tendency will decrease towards the centre of the roller to be replaced by a counteracting tendency between the centre of the roller and the centre of the receptacle. The roller will as a result obtain a rotation in the same direction as the receptacle 1 but at a reduced speed. There will thus take place a certain displacement between the outer surface of the roller and the inside wall of the receptacle at that place where said two surfaces contact with each other. If the material to be treated, as, for instance, the ingredients of dough is introduced into the receptacle 1 said material will be caused to rotate with the receptacle to be effectively kneaded when passing the roller 23, and said kneading action will be highly enhanced due to the relative displacement of the receptacle and the roller relatively to each other. At an appropriate point a scraper 24 bearing against the inside of the receptacle 1 is provided with the purpose in view to remove the material from the wall of the receptacle, thereby effectively assisting to the mixing of the material.

In order to facilitate emptying and cleaning of the apparatus the shaft 21 is removable and the roller is provided with a handle 25 at its top. To the same end the arm 19 may be divided and its sections held together by a disengaging coupling which, when disengaged, permits the outer-most section of the arm together with the shaft 21 and the roller to be readily lifted. The receptacle may be lifted because of its shaft 2 being in loose engagement with the sleeve 3. If desired or required, especially in case of large dimensions of the receptacle, the latter may be arranged to be tipped to discharge the material after treatment. To this end the receptacle may be connected to its shaft by a universal joint which may be locked against operation when the receptacle shall be in operation.

In the embodiment above described the receptacle 1 and the roller 23 are both cylindrical with plane bottoms. However, the shape of the receptacle and the roller may be modified, if desired.

In Fig. 3 there is shown by way of example a modified form of said two elements. For the rest, the design is the same as that above described. The receptacle 1 is formed with an outwardly curved wall so that the receptacle will have its largest diameter at half of its height, the opening of the receptacle being of considerably smaller diameter. The roller 23 as well as the scraper 24 have a correspondingly curved shape. In this design the uppermost portion of the wall of the receptacle 1 extends inwardly so as to cover the roller to a certain degree, which will render the apparatus suitable for treating materials which have a tendency of being pressed over the edge of the receptacle wall provided the latter were vertical, but which are prevented from doing so by the curved wall and are on the contrary moved inwards.

The operation of said last mentioned apparatus is, for the rest, similar to that described in connection with Figs. 1 and 2. The roller 23 bears both against the bottom and side wall of the receptacle, contacting with said walls at points situated at different distances apart from the centre of the receptacle so that also in this case the speed of the roller will be different from that of the receptacle.

Also other forms of the receptacle and roller may be used without departing from the principle of the invention.

Further modifications may comprise driving the roller by mechanical means, as by suitable transmission from the driving mechanism of the receptacle. In such case the roller may, of course, be given any speed desired relatively to that of the receptacle, as for instance a higher speed.

The machine is adapted to be used in the first instance as a household auxiliary in effecting kneading, mixing, crushing, butter preparing, stirring and similar operations. However, it may also be constructed for industrial purposes of similar art as those above referred to, or of different art, as, for instance, in preparing cement and mortar etc.

When using the apparatus for the treatment of materials yielding liquids which should be collected separately, as in crushing berries for the preparation of wine or fruit-juice, the plug 15 is removed to allow the liquid to run down through the hollow shafts 2, 3 to be collected. To the same purpose the receptacle may be provided with a strainer in its bottom in communication with the hollow shaft.

In the machine above described one roller only is provided. However, two or more rollers may be provided which are held by springs against the inside of the receptacle. Furthermore, the inside of the receptacle as well as the outside of the roller or rollers may be fluted or corrugated or similarly formed to increase the effect of the operation.

In Figs. 4–5 a machine of such a design is shown, in which two rollers are used, said rollers having corrugations to cooperate with similar corrugations on the inside of the receptacle. Said corrugations may be vertical or inclined, as, for instance, spirally, and may also take the shape of corresponding teeth so that a positive tooth engagement between the receptacle and the rollers will result.

In this embodiment the receptacle 1 is mounted and driven in the same way as above described so that any description thereof will be unnecessary. The receptacle 1 is shown as comprising two parts connected to each other along a horizontal plane the lower one of said parts being formed with spiral grooves. Situated within the receptacle are two rollers 23, each mounted on an individual shaft 21 parallel to the shaft 2 of the receptacle, that is, vertical. Said shafts 21 are each carried by an individual horizontal arm 19. One of these arms is attached to a sleeve 17 acted on by a spring 18 which is mounted on a vertical upright 16 in the same way as above described so as to hold the respective roller yieldingly against the inside of the receptacle. The other arm 19 is connected by a pivot 30 to said first mentioned arm. Inserted between the sleeves 20 of both arms 19 is a pressure spring 31 tending to move the rollers from each other to thereby hold them in engagement with the inside of the receptacle.

The roller shown in Fig. 4 is provided on its lower portion with grooves 32 corresponding to the grooves 33 of the receptacle. Of course, both of the rollers or one of them only may be formed with such grooves. The spiral grooves shown render the machine especially applicable for use in preparing butter, as the grooves will cause the cream to move up and down.

The material of the roller may be of any appropriate kind, as wood, iron or metal.

Fig. 6 shows a cup shaped receptacle without grooves and a roller likewise without grooves. Said roller which may be arranged in the same way as described above to be held against the inside of the receptacle is also made to be yieldingly pressed against the bottom of the receptacle so that it can yield and be lifted upwards should any hard grain or the like enter between the roller and said bottom. The means to secure said effect comprises a spring 35 inserted in a boring formed in the lowermost portion of the shaft 21 and resting against the bottom of a boring 36 formed in the roller to receive the shaft 21. Preferably, a ball, as 37, may be inserted between the lower end of the spring and said bottom. The shaft 21 does not reach down to the bottom of the boring 36 to permit vertical displacement of the roller.

Modifications may be made without departing from the principle of the invention.

For instance, the spring 18 may be dispensed with and only the spring 31 or equivalent springs may be used disposed so as to balance the lateral pressure upon the shaft of the receptacle.

The receptacle of this embodiment as well as of that first described may be partially closed at its top by a cover to prevent the material treated to be thrown out, especially in case said material consists of a liquid.

Further modifications may have reference to the mounting of the receptacle. In Figs. 7–10 some examples are shown of such modifications.

According to Fig. 7 the receptacle 1 is provided with a short, tubular shaft 2 which is loosely inserted in the cup shaped upper portion of the sleeve 3. The connection between the members 2 and 3 is effected by means of a bayonet clutch. To this end the shaft 2 is connected by the ring 50 attached to the under side of the receptacle 1 with a depending flange 51 having angularly shaped slots 52 formed in it (Fig. 8) to receive pins 53 secured to an outer, annular flange 54 of the sleeve 3. The flange 51 extends to a lower level than the tubular shaft 2 and, as a result, the receptacle can rest on said flange 51 when put aside after it has been lifted out of the sleeve 3.

As shown in Fig. 9 said flange 51 has been replaced by a ring 55 riveted or otherwise secured to the receptacle 1. The connection between the shaft members 2 and 3 is effected in this case by the pins 53 engaging with springs 56 attached to the ring 50, as shown in Fig. 10.

In both of the embodiments shown in Figs. 7, 8 and 9, 10, respectively, the receptacle is provided with a bottom valve 57 controlling the opening of the shaft 2 and which is held in closed state by means of a spring 58 attached to the lower end of the shaft 2. Said valve may be opened by means of the hollow stem 59, rotatable within the shaft 2. Said stem may be formed with spiral grooves 60 engaged by pins 61 attached to the sleeve 3. The stem carries at its lower end a handle 62 by means of which the stem can be rotated. The stem when rotated lifts or lowers the valve due to the engagement between the members 60 and 61.

In all of the embodiments described above the roller or rollers is or are driven by the friction with respect to the receptacle or the material or both, or by positive mesh of tooth. Yet, however, the roller or rollers may also be driven by a separate driving mechanism.

In Figs. 11 and 12 a machine is shown having a mechanically driven roller. The receptacle 1 is connected, as by a bayonet clutch, to the tubular, vertical shaft 2 which is driven in a certain direction from the driving shaft 200 by means of a bevel gear 201. By means of another bevel gear 202 a central, tubular shaft 203 is driven from the shaft 200 in the opposite direction. The shaft 203 extends through shaft 2 and through a central, tubular upright 204 in the receptacle 1. At its top the shaft 203 is loosely connected to a shaft 205 which corresponds to the shaft 16 in the embodiments hereinbefore described. The shaft 205 carries a horizontal arm 206 which is caused to rotate with the shaft 205. Pivoted to the arm 206 at 207 is another arm 208, which carries the vertical shaft 209 of the roller 210. A spring 211 attached to arm 206 and acting on arm 208 tends to press the roller against the wall of the receptacle 1.

The receptacle is provided with a cover completely closing the receptacle. The shaft 205 is free to move upwards to some extent against the action of a spring 213. The shaft 205 also carries a scraper 214 engaging the wall of the receptacle.

Upon rotation of the shaft 200 the receptacle 1 is rotated in one direction and the shafts 203, 205 in the opposite direction. This will cause the roller to move round the inside of the receptacle at the same time rotating around its own axis 209. The various movements resulting are indicated by arrows in Fig. 12. The central upright 204 and the shaft 203 may be provided with ports 215, 216 to allow liquid matters to discharge. Said ports may be controlled by a hollow, central rod 217 that may be moved up and down within the shaft 203 in the same way as is described above in connection with the valve stem 59 in Fig. 7.

What I claim is:

1. A machine for effecting kneading, crushing, mixing, and similar operations, comprising a rotary receptacle to receive the material to be treated, a roller in said receptacle rotatable around an independent axis substantially parallel to the axis of rotation of said receptacle, cooperating teeth on the inside of said receptacle and on said roller, and means to yieldingly hold said roller with its teeth in positive engagement with the teeth of said receptacle.

2. A machine for effecting kneading, crushing, mixing and similar operations, comprising an internally fluted rotary receptacle to receive the material to be treated, a fluted roller in said receptacle, rotatable around an independent axis substantially parallel to the axis of rotation of the receptacle, means to yieldingly hold said roller in frictional engagement with the inside of said receptacle to cause the roller to be rotated by friction upon the rotation of said receptacle.

3. A machine for effecting kneading, crushing, mixing, and similar operations, comprising a receptacle, a tubular stud depending centrally from the bottom of said receptacle, a closeable connection between the interior of said receptacle and the boring of said shaft, a driven hollow shaft to receive said stud, means to lock said stud to said shaft, a roller in said receptacle rotatable around an independent axis substantially parallel to said shaft, and means to yieldingly maintain said roller in engagement with the wall of said receptacle.

4. A machine for effecting kneading, crushing, mixing, and similar operations, comprising a receptacle, means to rotate said receptacle, a roller within said receptacle, a removable shaft to carry said roller within said receptacle, substantially parallel to the axis of rotation of said receptacle a swingable arm extending over the edge of said receptacle to carry said removable shaft means outside said receptacle to support said swingable arm, and a spring to act on said supporting means to yieldingly hold the roller in engagement with the wall of the receptacle.

5. A machine for effecting kneading, crushing, mixing, and similar operations, comprising a rotatable receptacle, two rollers within said receptacle, shafts substantially parallel to the axis of rotation of said receptacle to each carry one of said rollers, pivoted arms to carry said shafts and a spring inserted between said arms to move the rollers towards the wall of the receptacle.

6. A machine for effecting kneading, crushing, mixing, and similar operations, comprising a rotatable receptacle, two rollers within said receptacle, shafts substantially parallel to the axis of rotation of said receptacle to each carry one of said rollers, pivoted arms to carry said shafts and mutually balancing springs to act on said rollers to hold the latter in engagement with the wall of the receptacle.

7. A machine for effecting kneading, crushing, mixing, and similar operations, comprising a receptacle, a tubular stud, vertically depending from the bottom of said receptacle, a valve controlled connection between the interior of said receptacle and the boring of said shaft, a driven hollow shaft to receive said stud, means to lock said stud to said shaft, a roller in said receptacle rotatable around an independent axis substantially parallel to said shaft, means to yieldingly maintain said roller in engagement with the wall of said receptacle, and means movable up and down in said hollow shaft to operate said valve.

8. A machine for effecting kneading, crushing, mixing, and similar operations, comprising a receptacle, a tubular stud depending centrally from the bottom of said receptacle, a closeable connection between the interior of said receptacle and the boring of said shaft, a driven hollow shaft to receive said stud, means to lock said stud to said shaft, means to yieldingly maintain said roller in engagement with the wall of said receptacle, and a flange on the under side of said receptacle to support the receptacle when removed from said shaft 9. A machine for effecting kneading, crushing, mixing and similar operations, comprising a receptacle to receive the material to be treated rotatable about a vertical axis, a roller, means mounted outside the receptacle including a swingable arm extending over the edge of the receptacle and a vertical shaft depending from said arm to carry said roller within the receptacle, cooperating teeth on the inside of said receptacle and on said roller, and means to yieldingly hold said roller with its teeth in positive engagement with the teeth of said receptacle.

10. A machine for effecting kneading, crushing, mixing and similar operations, comprising an internally fluted receptacle to receive the material to be treated rotatable about a vertical axis, a fluted roller in said receptacle, rotatable around an independent axis substantially parallel to the axis of rotation of the receptacle, and means to yieldingly hold said roller in frictional engagement with the inner side surface of said receptacle to cause the roller to be rotated by friction upon the rotation of said receptacle.

11. A machine for effecting kneading, crushing, mixing and similar operations comprising an open topped receptacle to receive the material to be treated, rotatable about a vertical axis, a roller, means mounted outside the receptacle independently thereof including a vertical shaft rotatably mounted outside the receptacle, a swinging arm carried by said shaft so as to extend over the edge of the receptacle and another shaft carried by said arm so as to depend into said receptacle parallel to the axis thereof to rotatably carry said roller, and means acting on said first mentioned shaft to yieldingly press said roller against the inner side surface of the receptacle.

12. A machine for effecting kneading, crushing, mixing and similar operations, comprising a vertical rotatable shaft, an open topped receptacle removably connected to said shaft, a roller, a vertical shaft rotatably mounted outside the receptacle independently thereof, a swinging arm carried by said last-mentioned shaft so as to extend over the edge of the receptacle, a shaft carried by said arm so as to depend into said receptacle parallel to the axis thereof to rotatably carry said roller, and a spring acting on the shaft mounted outside the receptacle to yieldingly press said roller against the inner side surface of the receptacle.

13. A machine for effecting kneading, crushing, mixing and similar operations, comprising an open topped receptacle, a vertical shaft to rotatably carry said receptacle, means to rotate said receptacle about said shaft, a roller, means including a spring operated vertical shaft rotatably mounted outside the receptacle independently thereof, an arm carried by said shaft to extend over the edge of the receptacle and a removable shaft depending from said arm into the receptacle substantially parallel to the axis of rotation of said receptacle to carry said roller within the receptacle, said spring being so arranged as to yieldingly hold said roller against the inner surface of said receptacle.

14. A machine for effecting kneading, crushing, mixing and similar operations, comprising an open-topped receptacle, a vertical shaft to carry said receptacle, means to rotate said receptacle about said shaft, an upright mounted outside said receptacle independently thereof, a sleeve rotatably mounted on said upright, an arm swingably carried by said sleeve so as to extend over the edge of the receptacle, a removable shaft carried by said arm so as to depend into the receptacle substantially parallel to the axis thereof, a roller carried by said depending shaft, and a spring carried by said upright to act on said sleeve so as to yieldingly hold the roller in engagement with the inner side surface of the receptacle.

15. A machine for effecting kneading, crushing, mixing and similar operations comprising a rotatable vertical shaft, an open-topped receptacle removably connected to said shaft, a second shaft rotatably mounted outside the receptacle independently thereof, a swingable arm carried by said last-mentioned shaft so as to extend over the edge of the receptacle, a third shaft depending from said arm down into the receptacle parallel to the axis thereof and capable of being swung from one side thereof to the other, a roller carried by said depending shaft, and a spring acting on said shaft mounted outside of the receptacle to yieldingly hold said roller in engagement with the inner side surface of the receptacle.

16. A machine for effecting kneading, crushing, mixing and similar operations, comprising an open-topped rotatable receptacle, a roller, means including a stationary upright disposed outside the receptacle independently thereof, a sleeve rotatably mounted on said upright, a swingable arm carried by said sleeve, and a depending shaft carried by said arm to carry said roller within the receptacle, a spring carried by said upright to act on said sleeve so as to yieldingly hold said roller in engagement with the inner side surface of said receptacle, and a scraper within said receptacle to engage the wall thereof.

In testimony whereof I have signed my name.

BIRGER ZETTERGREN.